United States Patent Office 3,850,888
Patented Nov. 26, 1974

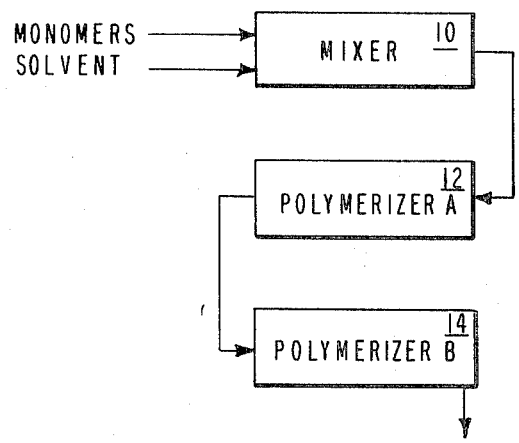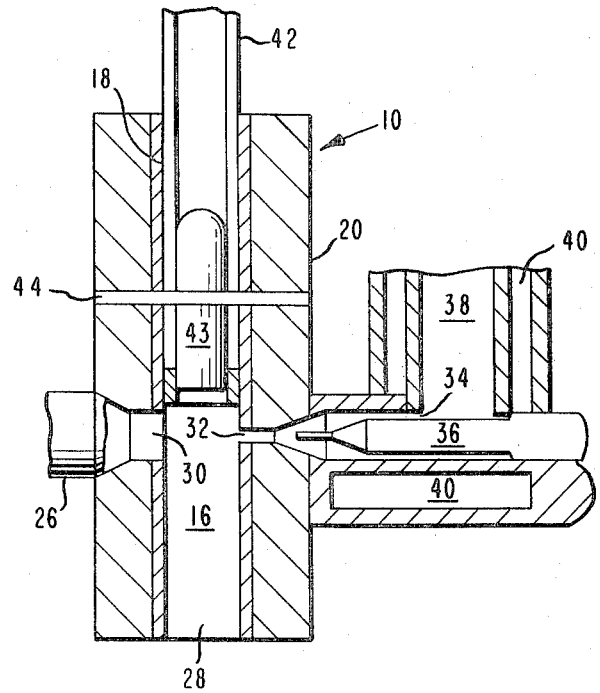

3,850,888
PROCESS FOR PRODUCING POLY-p-PHENYLENE TEREPHTHALAMIDE FROM SOLUTION OF p-PHENYLENE DIAMINE AND MOLTEN TEREPHTHALOYL CHLORIDE
James Allen Fitzgerald, Richmond, Va., and Kewal Krishan Likhyani, Wilmington, Del., assignors to E. I. du Pont de Nemours and Company, Wilmington, Del.
Filed Dec. 7, 1972, Ser. No. 312,955
Int. Cl. C08g 20/20
U.S. Cl. 260—78 R                 1 Claim

ABSTRACT OF THE DISCLOSURE

A novel process for the production of high molecular weight wholly aromatic polyamide from p-phenylene diamine and terephthaloyl chloride at commercial throughput rates. This polyamide is useful for the production of high strength and high modulus filaments.

---

This invention relates to a process useful for the production of condensation polymers.

BACKGROUND OF THE INVENTION

The preparation of wholly aromatic polyamides by the reaction of a diamine and a diacid halide in the presence of certain solvents for the reactants at temperatures below 100° C. is taught in U.S. 3,063,966 to Kwolek et al. Such polymerizations are extremely rapid. Some systems, e.g., p-phenylene diamine and terephthaloyl chloride in a solvent such as hexamethylphosphoramide, at useful concentrations change from a clear liquid to a stiff gel in from about 15 to 30 seconds. The gel can be broken into a crumblike product.

It has been found that this solid, crumblike material has unusual rheological properties, with flow behavior similar to Bingham-type plastics. When a shearing stress exceeding the yield stress is applied, the solid begins to flow and otherwise behaves as a fluid. The yield stress is related to polymer molecular weight and decreases with decreasing molecular weight. If the shearing stress is removed from the polymerization mixture, resolidification is almost instantaneous (less than one second), and all mixing stops and further molecular weight increase becomes negligible.

Particularly unusual is the discovery that the product of the viscosity and shear rate is not increased as the shear rate is increased. This allows the use of closely-wiped high shear polymerizers without the expected large increase in power and temperature as the molecular weight approaches its maximum.

Unstirred or stagnant areas of the reaction mixture will solidify to a tough gel that adheres to the surface of the reactor.

The rapid increase in viscosity makes it difficult to run such polymerizations in a continuous manner to produce high molecular weight polymer. Inadequate initial mixing of the reactants leads to an inbalance in stoichiometry that is difficult to correct as the viscosity increases. The result is low molecular weight polymer. Inadequate removal of the adiabatic heat of reaction causes the temperature to rise excessively and yields low molecular weight polymer. Lastly since the polymerization is not yet complete at the gel stage, inadequate mixing at this stage yields a lower molecular weight polymer.

An object of the present invention is to provide process improvements which will substantially avoid the difficulties enumerated above and faciltate the production of high molecular weight polymer at commercial throughput rates.

SUMMARY OF THE INVENTION

The novel continuous process of the present invention involves impinging a liquid stream comprising a 5 to 10% by weight solution of p-phenylene diamine in hexamethylphosphoramide against a stream of molten terephthaloyl chloride in a mixing zone, the streams being introduced continuously and at such rate as to provide substantially stoichiometric amounts of the diamine and acid halide which then form a liquid reaction mixture, substantially completely removing the liquid reaction mixture from the mixing zone within one second after introduction of the streams into said zone and introducing the liquid reaction mixture into a first polymerization zone with vigorous agitation to achieve distribution of the ingredients, cooling the mixture and substantially completely removing the product from the first polymerization zone within about 4 to 15 seconds and forwarding it to a second polymerization zone for mixing the product at a shearing stress sufficient to liquify any gel that forms at a shear rate of at least 100 sec.$^{-1}$ while cooling the product to a temperature not greater than 95° C. and substantially completely removing the product from the second polymerization zone within 1 to about 15 minutes.

BRIEF DESCRIPTION OF THE DRAWINGS

FIG. 1 is a diagrammatic illustration of the process of the present invention.

FIG. 2 is a schematic longitudinal sectional view through a preferred mixing apparatus.

DETAILED DESCRIPTION OF PREFERRED EMBODIMENTS

The various stages of the polymerization process to which the present disclosure is related have been illustrated diagrammatically in FIG. 1. In this process two condensation monomers, at least one of which is in solution while the other is molten or dissolved in a suitable solvent, are introduced into a monomer mixer 10 and rapidly mixed. The mixture is rapidly passed to polymerizer A (12).

Polymerizer 12 provides intense mixing of the polymerization reaction mixture before gelation occurs and cools the mixture.

Polymerizer B (14) provides high shear mixing and cooling of the polymerization reaction mixture until the polymerization is essentially complete. If desired, polymerizers 12 and 14 can be combined into a single apparatus.

FIG. 2 depicts a preferred mixing apparatus 10 (the subject matter of application Ser. No. 312,956, filed Dec. 7, 1972 concurrently herewith to Fickinger, Jeter and Likhyani) having a movable needle valve 36 to regulate the back pressure of the liquid passing through entrance 38 through space 34 and through orifice 32. Jacketing 40 provides means to heat or cool the liquid. The second liquid enters through entrance 26 through orifice 30. Pin 44 passes through a slot in hollow plunger 42. Replaceable sleeve 18 provides close fit with plunger 42.

In operation while the plunger 42 is moving down to exit 28 to ream the walls of the chamber, the two streams of liquid pass through the two slots 46 and drop down the center 48. Wiper 43 is attached to pin 44 and serves to clean polymer and gel from center 48 when plunger 42 is drawn up. Wiper 43 may be a rod fitting snugly within the hollow plunger and located upstream of the fluid inlet orifices.

The cross-section of mixing chamber 16 is preferably sound but other sections such as a square, etc. can be used. The sizes of the orifices 30 and 32 are preferably selected to provide a velocity of fluid streams such that in operation the mass velocity (i.e. fluid density × linear velocity) of the two streams are approximately equal so that they impinge in the center of the mixing chamber (midway between the opposing orifices).

Valve control means can be used before each orifice to regulate the pressure drop (and energy release) of the streams into the mixing chamber. Heating or cooling means can be provided for either or both liquids.

The apparatus is preferably used in a vertical position and exit 28 is suitably connected to polymerizer A.

The length of mixing chamber 16 should be about 6 to 12 (preferably 8 to 10) times the diameter of the chamber.

Polymerizers

A suitable polymerizer for both polymerizer A and B is an all surface-wiper continuous mixer such as disclosed in U.S. patents: 3,195,868; 3,198,491; 3,216,706; 3,387,826; 3,423,074; 3,575,382 and 3,618,902. Cooling means such as a jacketed body, hollow shafts and/or hollow mixing elements are preferably provided.

Polymerizer A, when used, provides intensive mixing and cooling for the short period of time (e.g. 4 to 15 seconds) before the reaction mixture gels. Polymerizer B provides mixing and cooling after the reaction mixture gels until the polymerization is essentially complete. The apparatus should have sufficient power to overcome the yield stress of the gel.

Process Considerations

The process is discussed below with reference to the polymerization of p-phenylene diamine and terephthaloyl chloride in the presence of hexamethylphosphoramide.

A stream of a solution of about 5 to 10% of p-phenylene diamine in hexamethylphosphoramide at a temperature as low as practical for solubility (e.g. about 10 to 30° C.) is intensively mixed with a jet stream of molten (85 to 120° C.) terephthaloyl chloride in stoichiometric proportions. The relatively thin (of the order of 100 centipoise) mixture is then forwarded within one second, preferably within 0.1 second, to a first polymerizer stage where it is intensely mixed with cooling for from 4 to 15 seconds. The partially polymerized product with a viscosity of about 10 to 100 poise and having a temperature of less than about 95° C. is then passed to the second polymerizer stage. In the second stage, the polymerization reaction product is submitted to intensive mixing for from 1 to about 15 minutes preferably 1 to 5 minutes characterized by a shear rate of at least 100 sec.$^{-1}$. The product is cooled while being mixed to provide an exit product temperature between about 40° C. and 95° C. The product is in the form of a dry crumb.

EXAMPLE

Using a monomer mixing apparatus similar to FIG. 2, molten terephthaloyl chloride at 90° C. is injected into the mixing chamber 16 through orifice 32 (0.105 in. diameter) at a velocity of about 81 inches/second. A solution (at about 16° C.) of 6.07% by weight of p-phenylene diamine in hexamethylphosphoramide is injected through orifice 30 (0.285 in. diameter) into mixing chamber 16 (0.407 inch D) at a velocity of about 100 inches/second. The mass velocity (i.e. velocity×density) of each fluid stream is approximately equal so that they impinge in the center of the chamber and flow out the exit at a velocity of about 55 inches/second. The hold-up time is about 0.08 second.

The exit of the monomer mixing apparatus is located immediately above the entrance of a continuous screw mixer (polymerizer) jacketed with cooling liquid. The conveyor blades of the mixer are operated to give a hold-up time of about 4.7 seconds. The polymerization product has a temperature of about 86° C. at the exit of the mixer.

The viscous liquid product is fed directly to the entrance of another continuous screw mixer (polymerizer). This mixer has an average hold-up time of about 75 seconds, and has a minimum shear rate of about 120 sec.$^{-1}$. The polymerization product, a dry crumblike material containing 12% polymer leaves the mixer at a temperature of about 67° C. The product has a yield stress of about 5.5 p.s.i. as measured with an Instron rheometer. Poly(p-phenylene terephthalamide) recovered from the crumb has an inherent viscosity of 5.3 as calculated from the viscosity of a solution of 0.5 gram of polymer in 100 ml. of concentrated sulfuric acid at 30° C.

This process is useful when a minor amount of the p-phenylene diamine and/or terephthaloyl chloride is replaced by another chemically equivalent monomer such as shown in U.S. Pat. 3,671,542 to Kwolek. The high molecular weight polymer produced in accordance with this invention is useful in the manufacture of high strength and high modulus fibers.

In addition to hexamethylphosphoramide, suitable solvents may be selected from dimethylacetamide, N-methylpyrrolidone and mixtures of these.

What is claimed is:

1. A continuous process for producing poly(p-phenylene terephthalamide) comprising impinging a liquid stream comprising a 5–10% by weight solution of p-phenylene diamine in hexamethylphosphoramide at a temperature of about 10° C. to 30° C. against a stream of molten terephthaloyl chloride at a temperature of from 85–120° C. in a mixing zone, the streams being introduced continuously and at such rate as to provide a liquid reaction mixture from substantially stoichiometric amounts of the diamine and acid halide, substantially completely removing the liquid reaction mixture from the mixing zone within one second after introduction of the streams into said zone and introducing the liquid reaction mixture into a first polymerization zone with vigorous agitation to achieve distribution of the ingredients, cooling the mixture to a temperature of less than about 95° C. and substantially completely removing the product from the first polymerization zone within about 4 to 15 seconds and forwarding it to a second polymerization zone and mixing the product at a shearing stress sufficient to liquify any gel that forms at a shear rate of at least 100 sec.$^{-1}$ while cooling the product to a temperature not greater than 95° C. and substantially completely removing the crumblike product from the second polymerization zone within 1 to about 15 minutes.

References Cited

UNITED STATES PATENTS

| | | | |
|---|---|---|---|
| 3,663,517 | 5/1972 | Adachi | 260—78 R |
| 3,679,636 | 7/1972 | Vogelfanger | 260—78 R |

HAROLD D. ANDERSON, Primary Examiner